United States Patent
Luo et al.

(10) Patent No.: US 12,255,852 B2
(45) Date of Patent: Mar. 18, 2025

(54) METHOD PERFORMED BY USER EQUIPMENT, AND USER EQUIPMENT

(71) Applicant: SHARP KABUSHIKI KAISHA, Sakai (JP)

(72) Inventors: Chao Luo, Shanghai (CN); Renmao Liu, Shanghai (CN); Yinan Zhao, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 257 days.

(21) Appl. No.: 17/790,841

(22) PCT Filed: Jan. 8, 2021

(86) PCT No.: PCT/CN2021/070805
§ 371 (c)(1),
(2) Date: Jul. 5, 2022

(87) PCT Pub. No.: WO2021/139750
PCT Pub. Date: Jul. 15, 2021

(65) Prior Publication Data
US 2023/0037535 A1 Feb. 9, 2023

(30) Foreign Application Priority Data

Jan. 10, 2020 (CN) .......................... 202010029675.4

(51) Int. Cl.
*H04L 5/00* (2006.01)
*H04W 72/20* (2023.01)
*H04W 72/04* (2023.01)

(52) U.S. Cl.
CPC .......... *H04L 5/0094* (2013.01); *H04L 5/0005* (2013.01); *H04W 72/20* (2023.01)

(58) Field of Classification Search
None
See application file for complete search history.

(56) References Cited

U.S. PATENT DOCUMENTS

2020/0228247 A1* 7/2020 Guo ...................... H04L 5/0048
2020/0351856 A1* 11/2020 Yeo ....................... H04L 1/0013
(Continued)

OTHER PUBLICATIONS

LG Electronics et al., "New WID on 5G V2X with NR sidelink", RP-190766, 3GPP TSG RAN Meeting #83, Shenzhen, China, Mar. 18-21, 2019.

(Continued)

*Primary Examiner* — Eunsook Choi
(74) *Attorney, Agent, or Firm* — ScienBiziP, P.C.

(57) ABSTRACT

According to the present invention, provided is a method performed by user equipment, and the method is characterized by including: obtaining indication information related to resource allocation; and determining $N_{indicated}^{res}$ time/frequency resources according to the indication information, wherein $N_{indicated}^{res}$ is a positive integer greater than or equal to 1, the indication information related to resource allocation includes information indicated in sidelink control information (SCI), and the information indicated in the SCI includes a time resource allocation indication value TRIV and/or a frequency resource allocation indication value FRIV.

3 Claims, 4 Drawing Sheets

PSCCH     PSSCH

(56) References Cited

U.S. PATENT DOCUMENTS

2020/0374860 A1\* 11/2020 Panteleev ............. H04L 5/0044
2021/0168790 A1\* 6/2021 Li ......................... H04L 1/1861
2022/0077991 A1\* 3/2022 Hwang ................. H04L 5/0053
2022/0159674 A1\* 5/2022 Deng .................. H04W 72/566

OTHER PUBLICATIONS

NTT Docomo, Inc., "New WID on New Radio Access Technology", RP-170855, 3GPP TSG RAN Meeting #75, Dubrovnik, Croatia, Mar. 6-9, 2017.
Huawei et al., "New WID on 3GPP V2X Phase 2", RP-170798, 3GPP TSG RAN Meeting #75, Dubrovnik, Croatia, Mar. 6-9, 2017.
LG Electronics et al., "New WI proposal: Support for V2V services based on LTE sidelink", RP-152293, 3GPP TSG RAN Meeting #70, Sitges, Spain, Dec. 7-10, 2015.

\* cited by examiner

METHOD PERFORMED BY USER EQUIPMENT, AND USER EQUIPMENT

TECHNICAL FIELD

The present invention relates to a method performed by user equipment, and user equipment.

BACKGROUND

An NR SL operation can support indicating one or more time/frequency resources in SCI. For example, a frequency-domain resource is indicated by means of a "frequency resource assignment" field in $1^{st}$-stage SCI, and for another example, a time-domain resource is indicated by means of "time resource assignment" in the $1^{st}$-stage SCI. How to determine the location and/or the size of one or more indicated frequency-domain resources according to the value of a "frequency resource assignment" field and how to determine the location of one or more indicated time-domain resources according to the value of a "time resource assignment" field are problems that need to be solved in SCI design.

PRIOR ART DOCUMENTS

Non-Patent Documents

Non-Patent Document 1: RP-152293, New WI proposal: Support for V2V services based on LTE sidelink
Non-Patent Document 2: RP-170798, New WID on 3GPP V2X Phase 2
Non-Patent Document 3: RP-170855, New WID on New Radio Access Technology
Non-Patent Document 4: RP-190766, New WID on 5G V2X with NR sidelink

SUMMARY

In order to solve at least part of the aforementioned problems, the present invention provides a method performed by user equipment and user equipment, so that UE transmitting SCI can efficiently and unambiguously indicate an allocated time/frequency resource to UE receiving the SCI.

According to the present invention, provided is a method performed by user equipment, and the method is characterized by comprising: obtaining indication information related to resource allocation; and determining $N_{indicated}^{res}$ time/frequency resources according to the indication information, wherein $N_{indicated}^{res}$ is a positive integer greater than or equal to 1, the indication information related to resource allocation comprises information indicated in sidelink control information (SCI), and the information indicated in the SCI comprises a time resource allocation indication value TRIV and/or a frequency resource allocation indication value FRIV.

Preferably, a slot $t_1$ where a first time/frequency resource is located and a starting sub-channel $f_1$ thereof are determined according to a physical sidelink control channel (PSCCH) carrying the SCI.

Preferably, $N_{indicated}^{res}$ and a slot where each time/frequency resource other than the first time/frequency resource is located are determined according to the time resource allocation indication value TRIV, and the number m of sub-channels occupied by each time/frequency resource and a starting sub-channel of each time/frequency resource other than the first time/frequency resource are determined according to the frequency resource allocation indication value FRIV.

Preferably, if the value of the time resource allocation indication value TRIV corresponds to $N_{indicated}^{res}=3$, then the time resource allocation indication value TRIV is used to indicate a slot $t_2$ where a second time/frequency resource is located and a slot $t_3$ where a third time/frequency resource is located, wherein:

if $(\Delta t_{2,1}-1) \leq \lfloor (32-2)/2 \rfloor$, then $TRIV=30 \cdot (\Delta t_{2,1}-1)+(31-\Delta t_{3,1})+32$, otherwise $TRIV=30-(30-\Delta t_{2,1}+1)+(30-1-(31-\Delta t_{3,1}))+32$, where $\Delta t_{2,1}$ is an offset between $t_1$ and $t_2$, and $\Delta t_{3,1}$ is an offset between $t_1$ and $t_3$.

Preferably, if the maximum number of allocable time/frequency resources $N_{max}^{res}=2$, then m and a starting sub-channel $f_2$ of the second time/frequency resource are determined according to the frequency resource allocation indication value FRIV.

FRIV can be defined as follows herein:

$FRIV=f_2+\Sum_{i=1}^{m-1}(N_{subChannel}^{SL}+1-i)$, where $N_{subChannel}^{SL}$ represents the number of sub-channels occupied by a resource pool.

Preferably, if the maximum number of allocable time/frequency resources $N_{max}^{res}=3$, then m, the starting sub-channel $f_2$ of the second time/frequency resource, and a starting sub-channel $f_3$ of the third time/frequency resource are determined according to the frequency resource allocation indication value FRIV.

FRIV is defined as follows herein:

$FRIV=f_2 \cdot (N_{subChannel}^{SL}+1-m)+f_3+\Sum_{i=1}^{m-1}(N_{subChannel}^{SL}+1-i)^2$.

Alternatively, FRIV is defined as follows:

$FRIV=f_3 \cdot (N_{subChannel}^{SL}+1-m)+f_2+\Sum_{i=1}^{m-1}(N_{subChannel}^{SL}+1-i)^2$.

where $N_{subChannel}^{SL}$ represents the number of sub-channels occupied by a resource pool.

Preferably, if $N_{max}^{res}=2$ and if $N_{indicated}^{res}=1$, then the determined value of $f_2$ does not indicate a starting sub-channel of any time/frequency resource.

Preferably, if $N_{max}^{res}=3$ and if $N_{indicated}^{res}=1$, then the determined values of $f_2$ and $f_3$ do not indicate a starting sub-channel of any time/frequency resource.

Preferably, if $N_{max}^{res}=3$ and if $N_{indicated}^{res}=2$, then the determined value of $f_3$ does not indicate a starting sub-channel of any time/frequency resource.

In addition, according to the present invention, proposed is user equipment, comprising: a processor; and a memory having instructions stored therein, wherein the instructions, when run by the processor, perform the aforementioned method.

Therefore, the present invention provides a method in which mapping from "frequency resource assignment" in $1^{st}$-stage SCI to frequency parameter(s) of an allocated time/frequency resource (such as the number of sub-channels occupied by each allocated time/frequency resource, or a starting sub-channel of each of part of or all of allocated time/frequency resources), and/or mapping from a "time resource assignment" field in the $1^{st}$-stage SCI to time parameter(s) of the allocated time/frequency resource (such as a slot where each of part of or all of the allocated time/frequency resources is located) is provided so that UE transmitting the SCI can efficiently and unambiguously indicate the allocated time/frequency resource to UE receiving the SCI.

BRIEF DESCRIPTION OF DRAWINGS

The aforementioned and other features of the present invention will be more apparent from the following detailed description in combination with the accompanying drawings, in which.

DETAILED DESCRIPTION

Figure 1:
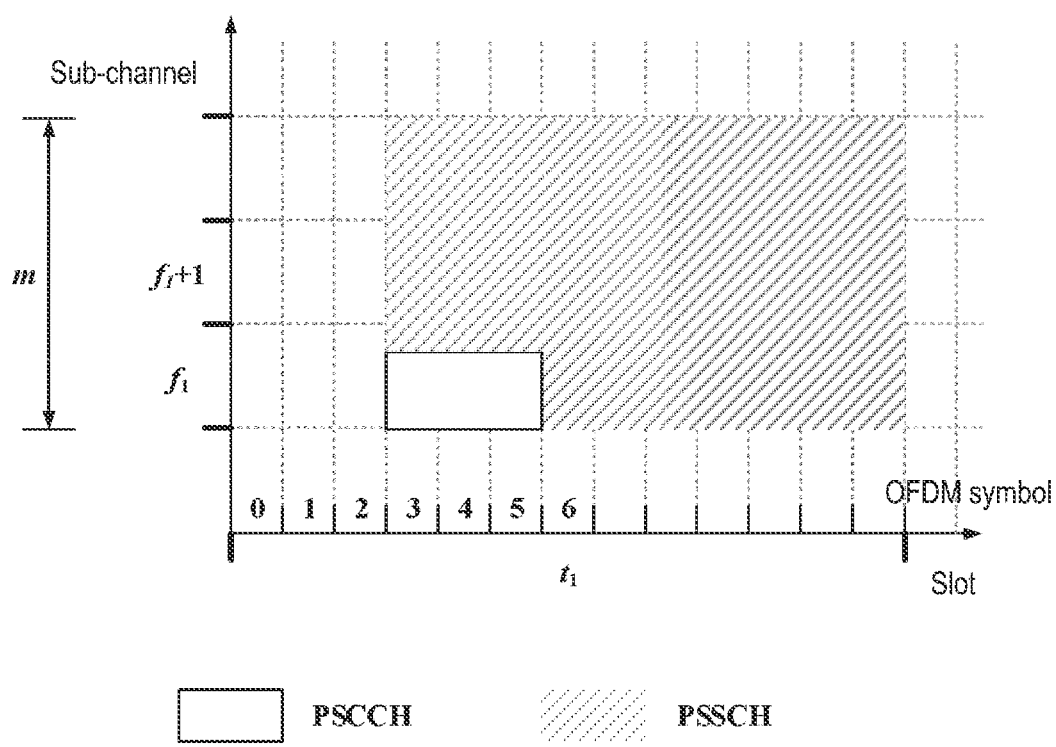
FIG. 1 shows an example of multiplexing a PSCCH and a PSSCH on a time/frequency resource.

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

In the following description, a 5G mobile communication system and its later evolved versions are used as exemplary application environments to set forth a plurality of embodiments according to the present invention in detail. However, it is to be noted that the present invention is not limited to the following embodiments but is applicable to many other wireless communication systems, such as a communication system after 5G and a 4G mobile communication system before 5G.

Some terms involved in the present invention are described below. Unless otherwise specified, the terms involved in the present invention adopt the definitions herein. The terms provided in the present invention may vary in LTE, LTE-Advanced, LTE-Advanced Pro, NR, and subsequent communication systems, but unified terms are used in the present invention. When applied to a specific system, these terms can be replaced with terms used in the corresponding system.

3GPP: 3rd Generation Partnership Project
AS: Access Stratum
BWP: Bandwidth Part
CA: Carrier Aggregation
CCE: Control Channel Element
CORESET: Control Resource Set
CP: Cyclic Prefix
CP-OFDM: Cyclic Prefix Orthogonal Frequency Division Multiplexing
CRB: Common Resource Block
CRC: Cyclic Redundancy Check
CSI: Channel-State Information
CSS: Common Search Space
DC: Dual Connectivity
DCI: Downlink Control Information
DFN: Direct Frame Number
DFT-s-OFDM: Discrete Fourier Transformation Spread Orthogonal Frequency Division Multiplexing
DL: Downlink
DL-SCH: Downlink Shared Channel
DM-RS: Demodulation Reference Signal
eMBB: Enhanced Mobile Broadband
eNB: E-UTRAN Node B
E-UTRAN: Evolved UMTS Terrestrial Radio Access Network
FDD: Frequency Division Duplex
FDRA: Frequency Domain Resource Assignment
FR1: Frequency Range 1
FR2: Frequency Range 2
GLONASS: GLObal NAvigation Satellite System
gNB: NR Node B
GNSS: Global Navigation Satellite System
GPS: Global Positioning System
HARQ: Hybrid Automatic Repeat Request
ID: Identity (or Identifier)
IE: Information Element
IP: Internet Protocol
LCID: Logical Channel ID
LTE: Long Term Evolution
LTE-A: Long Term Evolution-Advanced
MAC: Medium Access Control
MAC CE: MAC Control Element
MCG: Master Cell Group
MIB: Master Information Block
MIB-SL: Master Information Block-Sidelink
MIB-SL-V2X: Master Information Block-Sidelink-Vehicle to Everything
MIB-V2X: Master Information Block-Vehicle to Everything
mMTC: massive Machine Type Communication
NAS: Non-Access Stratum
NDI: New Data Indicator
NR: New Radio
NUL: Normal Uplink
OFDM: Orthogonal Frequency Division Multiplexing
PBCH: Physical Broadcast Channel
PDCCH: Physical Downlink Control Channel
PDCP: Packet Data Convergence Protocol
PDSCH: Physical Downlink Shared Channel
PSBCH: Physical Sidelink Broadcast Channel
PSCCH: Physical Sidelink Control Channel
PSFCH: Physical Sidelink Feedback Channel
PSSCH: Physical Sidelink Shared Channel
PRB: Physical Resource Block
PSS: Primary Synchronization Signal
PSS-SL: Primary Synchronization Signal for Sidelink
PSSS: Primary Sidelink Synchronization Signal
PTAG: Primary Timing Advance Group
PUSCH: Physical Uplink Shared Channel
PUCCH: Physical Uplink Control Channel
QCL: Quasi Co-Location
QoS: Quality of Service
QZSS: Quasi-Zenith Satellite System
RAR: Random Access Response
RB: Resource Block
RE: Resource Element
REG: Resource-Element Group
RF: Radio Frequency
RLC: Radio Link Control
RNTI: Radio Network Temporary Identifier
RRC: Radio Resource Control
RV: Redundancy Version
S-BWP: Sidelink Bandwidth Part S-MIB: Sidelink Master Information Block
S-PSS: Sidelink Primary Synchronization Signal
S-SSB: Sidelink SS/PBCH Block (Sidelink Synchronization Signal/Physical Broadcast Channel Block)
S-SSS: Sidelink Secondary Synchronization Signal
SCG: Secondary Cell Group
SCI: Sidelink Control Information
SCS: Subcarrier Spacing
SDAP: Service Data Adaptation Protocol
SFN: System Frame Number
SIB: System Information Block
SL: Sidelink
SL BWP: Sidelink Bandwidth Part
SL MIB: Sidelink Master Information Block
SL PSS: Sidelink Primary Synchronization Signal
SL SS: Sidelink Synchronization Signal
SL SSID: Sidelink Synchronization Signal Identity (or Sidelink Synchronization Signal Identifier)
SL SSB: Sidelink SS/PBCH Block (Sidelink Synchronization Signal/Physical Broadcast Channel Block)
SL SSS: Sidelink Secondary Synchronization Signal
SLSS: Sidelink Synchronization Signal
SLSS ID: Sidelink Synchronization Signal Identity (or Sidelink Synchronization Signal Identifier)
SLSSID: Sidelink Synchronization Signal Identity (or Sidelink Synchronization Signal Identifier)
SpCell: Special Cell
SRS: Sounding Reference Signal
SSB: SS/PBCH Block (Synchronization Signal/Physical Broadcast Channel Block)
SSB-SL: SS/PBCH Block for Sidelink (Sidelink Synchronization Signal/Physical Broadcast Channel Block)
SSS: Secondary Synchronization Signal
SSS-SL: Secondary Synchronization Signal for Sidelink
SSSB: Sidelink SS/PBCH Block (Sidelink Synchronization Signal/Physical Broadcast Channel Block)
SSSS: Secondary Sidelink Synchronization Signal
STAG: Secondary Timing Advance Group
Sub-channel: Sub-channel
SUL: Supplementary Uplink
TA: Timing Advance
TAG: Timing Advance Group
TB: Transport Block
TCP: Transmission Control Protocol
TDD: Time Division Duplex
TPC: Transmit Power Control
UE: User Equipment
UL: Uplink
UMTS: Universal Mobile Telecommunications System
URLLC: Ultra-Reliable and Low Latency Communication
USS: UE-specific Search Space
V2I: Vehicle-to-Infrastructure
V2N: Vehicle-to-Network
V2P: Vehicle-to-Pedestrian
V2V: Vehicle-to-Vehicle
V2X: Vehicle-to-Everything
VRB: Virtual Resource Block Unless otherwise specified, in all embodiments and implementations of the present invention:

Optionally, "send" may be replaced with "transmit" where applicable.

Optionally, "higher layer" may refer to one or more protocol layers or protocol sub-layers above a physical layer. For example, a MAC layer, an RLC layer, a PDCP layer, a PC5-RRC layer, a PC5-S layer, an RRC layer, a V2X layer, an application layer, a V2X application layer, or the like.

Optionally, "pre-configuration" may be pre-configuration performed by means of a higher layer protocol/signaling. For example, it is pre-configured in a specific storage location in the UE (for example, it is pre-configured according to the specification of the higher layer protocol), or pre-configured in a specific accessible storage location in the UE (for example, it is pre-configured according to the specification of the higher layer protocol).

Optionally, "configuration" may be configuration performed by means of a higher layer protocol/signaling. For example, configuration is performed for the UE by means of RRC signaling.

Optionally, "starting subcarrier (or resource block, or resource block group, or sub-channel)" may also be referred to as "first subcarrier (or resource block, or resource block group, or sub-channel)", or may be referred to as "lowest numbered subcarrier (or resource block, or resource block group, or sub-channel)," or may be referred to as "lowest subcarrier (or resource block, or resource block group, or sub-channel)".

Optionally, a time-domain resource may also be referred to as a time resource.

Optionally, a frequency-domain resource may also be referred to as a frequency resource.

Optionally, "symbol" refers to "OFDM symbol".

Optionally, in one slot, OFDM symbol numbers may start from 0. For example, for a normal CP, a set of OFDM symbol numbers in one slot may be $\{0, 1, \ldots, 13\}$. For another example, for an extended CP, a set of OFDM symbol numbers in one slot may be $(0, 1, \ldots, 11)$.

Optionally, the resource block may refer to a virtual resource block (VRB), or may refer to a physical resource block (PRB), or may refer to a common resource block (CRB), or may refer to a resource block defined in other manner.

Optionally, in one resource block, subcarrier numbers may start from 0. For example, a set of subcarrier numbers in one resource block may be $\{0, 1, \ldots, 11\}$.

Optionally, an offset of one metric value (denoted as $x_2$) relative to another metric value (denoted as $x_1$) may also be referred to as an offset from the latter to the former. For example, an offset of the slot $t_2$ relative to the slot $t_1$ may also be referred to as an offset from the slot $t_1$ to the slot $t_2$, and vice versa.

Optionally, "slot t" may refer to a slot numbered as t.

Optionally, slots may be numbered in a subframe. For example, for a 30 kHz SCS, a slot in a subframe may be numbered using the value of any element in a set $\{0, 1\}$.

Optionally, slots may be numbered in a half frame. For example, for a 30 kHz SCS, a slot in a subframe may be numbered using the value of any element in a set $\{0, 1, \ldots, 9\}$.

Optionally, slots may be numbered in a frame. For example, for a 30 kHz SCS, a slot in a subframe may be numbered using the value of any element in a set $\{0, 1, \ldots, 19\}$.

Optionally, slots may be numbered within a frame numbering period (such as 1024 frames). For example, for a 30 kHz SCS, a slot in 1024 frames may be numbered using the value of any element in a set $\{0, 1, \ldots, 20479\}$.

Optionally, slots may be numbered starting from any slot, and any number of slots may be used as a period for slot numbering. For example, part of or all of slots $t_1, t_2, \ldots, t_N$ may be located in the same subframe or half frame or frame or frame numbering period (such as 1024 frames), or may be located in different subframes or half frames or frames or frame numbering periods (such as 1024 frames).

Optionally, for slots $t_1, t_2, \ldots, t_N$, where applicable, $t_1$ may be represented by an offset of $t_i$ ($2 \leq i \leq N$) relative to $t_1$ (such as $\Delta t_{i,1} = t_i - t_1$). Optionally, in this case, it can be considered that $t_1 = 0$.

In communication based on device to device (D2D) technology, an interface between devices (also referred to as user equipment (UE)) can be referred to as a PC5 interface. A corresponding transmission link on a physical layer may be referred to as a "direct link" or "sidelink" (SL for short) so as to be distinguished from an uplink (UL for short) and a downlink (DL for short). Communication based on an SL may be referred to as sidelink (SL) communication. An SL based on LTE technology may be referred to as an LTE SL. An SL based on NR technology may be referred to as an NR SL. 5G V2X communication may be based on an LTE SL or an NR SL. Hereinafter, "SL" refers to an NR SL unless otherwise specified.

A physical layer of an SL interface can support transmissions in one or more modes, such as broadcast transmission, groupcast transmission, unicast transmission, and the like, in one or more of in-coverage, out-of-coverage, and partial-coverage scenarios.

For frequency range 1 (FR1), a subcarrier spacing (SCS, denoted as $\Delta f$, in units of kHz) corresponding to the SL may be 15 kHz (normal CP), or 30 kHz (normal CP), or 60 kHz (normal CP or extended CP). For frequency range 2 (FR2), an SCS corresponding to the SL may be 60 kHz (normal CP or extended CP), or 120 kHz (normal CP). Each SCS corresponds to one SCS configuration (denoted as $\mu$). For example, $\Delta f = 15$ kHz corresponds to $\mu = 0$, $\Delta f = 30$ kHz corresponds to $\mu = 1$, $\Delta f = 60$ kHz corresponds to $\mu = 2$, $\Delta f = 120$ kHz corresponds to $\mu = 3$, and so on. For another example, for any given $\mu$, $\Delta f = 2^\mu \cdot 15$ kHz. $\mu$ may be an SCS configuration of an SL carrier. For example, all SL transmissions in one SL carrier use the same SCS configuration and/or the same CP. $\mu$ may be an SCS configuration of a sidelink bandwidth part (SL BWP, or referred to as S-BWP, or referred to as SBWP, or referred to as SL-BWP, or referred to as BWP-SL, or referred to as BWP for short). For example, all SL transmissions in one SL BWP use the same SCS configuration and/or the same CP. $\mu$ may be an SCS configuration of a resource pool. For example, all SL transmissions in one resource pool use the same SCS configuration and/or the same CP.

Signals and channels related to an SL operation may include:
  an SL PSS (sidelink primary synchronization signal), or referred to as an S-PSS, or referred to as an SPSS, or referred to as an SL-PSS, or referred to as a PSS-SL, or referred to as a PSSS (primary sidelink synchronization signal), or the like;
  an SL SSS (sidelink secondary synchronization signal), or referred to as an S-SSS, or referred to as an SSSS (sidelink secondary synchronization signal), or referred to as an SL-SSS, or referred to as an SSS-SL, or referred to as an SSSS (secondary sidelink synchronization signal), or the like;
  a PSBCH (physical sidelink broadcast channel);
  a PSCCH (physical sidelink control channel);
  a PSSCH (physical sidelink shared channel); and
  a PSFCH (physical sidelink feedback channel).

The SL PSS, the SL SSS, and the PSBCH may be organized together into a block on a time/frequency resource. The block is referred to as, for example, an SL SSB (sidelink synchronization signal/PSBCH block, or SSS/PSBCH block), or is referred to as an SSS/PSBCH block, or is referred to as an S-SS/PSBCH block, or is referred to as an S-SSB, or is referred to as an SSSB, or is referred to as an SL-SSB, or is referred to as an SSB-SL. A transmission bandwidth (for example, 11 resource blocks) of the SL SSB may be located in a corresponding SL carrier (for example, located in one SL BWP configured in the SL carrier). The SL PSS and/or the SL SSS may carry an SL SSID (sidelink synchronization identity, or sidelink synchronization identifier, or sidelink synchronization signal identity, or sidelink synchronization signal identifier, or referred to as SL-SSID, or referred to as SSID-SL, or referred to as SLSSID, or referred to as SLSS ID, or referred to as S-SSID, or the like), and the PSBCH may carry an SL MIB (sidelink master information block, or referred to as SL-MIB, or referred to as S-MIB, or referred to as MIB-SL). The SL MIB may include configuration information of the SL, such as information related to a direct frame number (or referred to as a frame number) or a direct half frame number (or referred to as a half frame number) or a direct subframe number (or referred to as a subframe number) or a direct slot number (or referred to as a slot number) where a PSBCH (or a corresponding SL SSB) carrying the SL MIB is located.

On the SL, a time-domain resource and/or a frequency-domain resource used to transmit the SL SSB may be configured by means of higher layer parameter(s). For example, in the frequency domain, a location of the SL SSB in the frequency domain may be configured by means of a parameter absoluteFrequencySSB-SL. For another example, in the time domain, in a period having a length of 16 frames, the number of SL SSBs (for example, denoted as $N_{period}^{S\text{-}SSB}$) may be configured by means of a parameter numSSB-withinPeriod-SL. In said period having a length of 16 frames, an index of a slot in which an SL SSB having a number (or index) of $i_{S\text{-}SSB}$ ($0 \leq i_{S\text{-}SSB} \leq N_{period}^{S\text{-}SSB} - 1$) is located may be $N_{offset}^{S\text{-}SSB} + N_{interval}^{S\text{-}SSB} \cdot i_{S\text{-}SSB}$, wherein $NN_{offset}^{S\text{-}SSB}$ may be configured by means of a parameter timeOfsetSSB-SL, and $N_{interval}^{S\text{-}SSB}$ may be configured by means of a parameter $N_{interval}^{S\text{-}SSB}$.

Sometimes, it may be considered that the time-domain resource and/or the frequency-domain resource configured for the SL SSB in the SL carrier corresponds to a candidate SL SSB (or referred to as SL SSB candidate). On a time-domain resource and/or a frequency-domain resource corresponding to one candidate SL SSB, one or more SL SSB transmissions (for example, respectively from different UEs) may exist at the same time, or no SL SSB transmission may exist.

A synchronization source (or referred to as a synchronization reference, or a synchronization reference source) related to SL synchronization may include a GNSS (global navigation satellite system, a gNB, an eNB, and UE (for example, NR UE, or LTE UE, or NR UE or LTE UE). UE serving as a synchronization source (for example, UE transmitting the SL SSB) may be referred to as SyncRefUE.

Examples of the GNSS may include the GPS (Global Positioning System), the GLONASS (GLObal NAvigation Satellite System), the BeiDou (Beidou Navigation Satellite System), the Galileo (Galileo Navigation Satellite System), the QZSS (Quasi-Zenith Satellite System), etc.

One or more (for example, one) SL BWPs may be configured in the SL carrier. In each SL BWP, a start symbol of an SL time-domain resource in one slot may be configured by means of a parameter startSLsymbols, and the number of symbols of the SL time-domain resource in one slot may be configured by means of a parameter lengthSLsymbols. Symbols of the SL time-domain resource in one slot may be contiguous, for example, symbol 7 through symbol 13 (namely symbols 7, 8, 9, 10, 11, 12, and 13).

SL transmission may be performed in a specific resource pool. One or more resource pools may be configured in one SL BWP. In each resource pool, in the frequency domain, the location of a starting resource block of a starting sub-channel of the resource pool in the SL BWP may be configured by means of a parameter startRB-Subchannel.

In the frequency domain, the number (denoted as $N_{subChannel}^{SL}$) of sub-channels occupied by the resource pool may be configured by means of a parameter numSubchannel. The $N_{subChannel}^{SL}$ sub-channels may be contiguous in the frequency domain.

In the frequency domain, each sub-channel may consist of one or more resource blocks, and the specific number of resource blocks (referred to as the size of the sub-channel, for example, denoted as $n_{subChannelsize}$) may be configured by means of a parameter subchannelsize. The $n_{subChannelsize}$ resource blocks may be contiguous in the frequency domain.

In the frequency domain, in ascending order of frequency, all sub-channels in one resource pool may be respectively numbered as 0, 1, . . . , $N_{subChannel}^{SL}-1$. A sub-channel numbered as i may be referred to as "sub-channel i" ($0 \leq i \leq N_{subChannel}^{SL}-1$).

In the time domain, one or more slots available for the resource pool (or belonging to the resource pool) and appearing periodically may be configured by means of a parameter timeresourcepool (for example, by means of a slot bitmap). The size of the period may be configured by means of a parameterperiodResourcePool.

Methods for allocating resources (such as time-domain resources, or frequency-domain resources, or code-domain resources) related to the SL operation may be classified as follows:

Mode 1: a base station schedules SL resources for SL transmission.

Mode 2: UE determines the SL resources for SL transmission (that is, the base station does not participate in scheduling of the SL resources). For example, UE performing an SL transmission operation autonomously determines the SL resources for the SL transmission.

The UE may schedule data transmission by means of sidelink control information (SCI). The SL operation may support "two-stage SCI". $1^{st}$-stage SCI may include information such as resource reservation and/or resource allocation, so that all UEs monitoring the SL can perform sensing with respect to a resource reservation and/or resource allocation status. $2^{nd}$-stage SCI may include other information, such as information related to HARQ feedback and the like. Hereinafter, unless otherwise specified, when mentioned individually, "SCI" may include only the $1^{st}$-stage SCI, or may include only the $2^{nd}$-stage SCI, or may include both the $1^{st}$-stage SCI and the $2^{nd}$-stage SCI.

The following are some examples of the information that can be included in the $1^{st}$-stage SCI:
priority;
frequency resource assignment;
time resource assignment;
resource reservation period; and
$2^{nd}$-stage SCI format.

The following are some examples of the information that can be included in the $2^{nd}$-stage SCI:
source layer-1 identifier (source layer-1 ID, or referred to as layer-1 source ID, or referred to as physical layer source ID, or referred to as source ID (when the context is clear));
destination layer-1 identifier (destination layer-1 ID, or referred to as layer-1 destination ID, or referred to as physical layer destination ID, or referred to as destination ID (when the context is clear));
HARQ process identifier (HARQ process ID), or an HARQ process number;
new data indicator (NDI); and
redundancy version (RV).

The $1^{st}$-stage SCI may be carried on a PSCCH. The $2^{nd}$-stage SCI may be multiplexed, together with data to be transmitted, on a PSSCH associated with (or scheduled by) the PSCCH. The PSCCH and the PSSCH associated therewith may be multiplexed, in a certain manner, on the time-domain resource and/or the frequency-domain resource allocated for SL transmission (for example, a sub-channel where a starting resource block of the PSCCH is located is a starting sub-channel of the PSSCH associated therewith. For another example, the starting resource block of the PSCCH is a starting resource block of the starting sub-channel of the PSSCH associated therewith). In addition, it may be considered that the $1^{st}$-stage SCI and/or the corresponding $2^{nd}$-stage SCI schedules the PSSCH (or schedules transmission of the PSSCH, or schedules transmission of a TB carried on the PSSCH). FIG. 1 shows an example of multiplexing a PSCCH and a PSSCH on a time/frequency resource. A sub-channel where a starting resource block of the PSCCH is located is $f_1$, and therefore after detecting the PSCCH, UE can determine that a starting sub-channel of the PSSCH associated with the PSCCH is $f_1$. A slot where the PSCCH is located is $t_l$, and therefore after detecting the PSCCH, the UE can determine that a slot where the PSSCH associated with the PSCCH is located is $t_1$.

In NR SL, how to determine the value of one or more corresponding parameters according to the value of a "frequency resource assignment" field or a "time resource assignment" field in $1^{st}$-stage SCI is a problem that needs to be solved. For example, frequency-domain parameter(s) (for example, the number of sub-channels occupied, or a starting sub-channel) of each allocated time/frequency resource is determined according to the value of the "frequency resource assignment" field. For another example, a slot in which each allocated time/frequency resource is located is determined according to the value of the "time resource assignment" field.

Embodiment 1

The method performed by user equipment according to Embodiment 1 of the present invention is described below with reference to FIG. 2.

Figure 2:
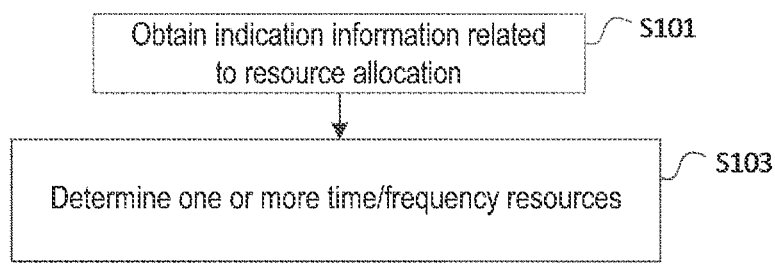
FIG. 2 is a flowchart showing a method performed by user equipment according to Embodiment 1 of the present invention.

FIG. 2 is a flowchart showing the method performed by user equipment according to Embodiment 1 of the present invention.

As shown in FIG. 2, in Embodiment 1 of the present invention, steps performed by user equipment (UE) (also referred to as receiving UE or RX UE in Embodiment 1 of the present invention) include: step S101 and step S103.

Specifically, in step S101, indication information related to resource allocation (or resource assignment) is obtained, wherein:

Optionally, the information related to resource allocation may include one or more of the following:
- a start symbol (denoted as $l_{start}^{SL}$) of an SL time-domain resource in one slot;
- the number (denoted as $N_{sym}^{SL}$) of symbols of the SL time-domain resource in one slot;
- the size (denoted as W) of a time resource allocation window;
- the number (denoted as $N_{subChannel}^{SL}$) of sub-channels occupied by a resource pool (for example, a resource pool related to the resource allocation, denoted as P);
- the maximum number (denoted as $N_{max}^{res}$) of allocable time/frequency resources;
- a frequency resource allocation indication value (denoted as FRIV); and
- a time resource allocation indication value (denoted as TRIV).

Optionally, the information related to resource allocation may include predefined information. For example, the size of the time resource allocation window may be predefined as W=32 slots.

Optionally, the information related to resource allocation may include configuration information or pre-configuration information. For example, the start symbol $l_{start}^{SL}$ of the SL time-domain resource in one slot may be configured or pre-configured by means of a parameter startSLsymbols. For another example, the number $N_{symb}^{SL}$ of symbols of the SL time-domain resource in one slot may be configured or pre-configured by means of a parameter lengthSLymbols. For another example, the number $N_{subChannel}^{SL}$ of sub-channels occupied by the resource pool P may be configured or pre-configured by means of a parameter numSubchannel. For another example, the maximum number $N_{max}^{res}$ of allocable time/frequency resources may be configured or pre-configured by means of a parameter maxNumResource. For example, when a parameter maxNumResource is configured to be 2, $N_{max}^{res}=2$. For another example, when the parameter maxNumResource is configured to be 3, $N_{max}^{res}=3$. For another example, when the parameter maxNumResource is not configured, $N_{max}^{res}=1$. For another example, when the parameter maxNumResource is not configured, $N_{max}^{res}=2$. For another example, when the parameter maxNumResource is not configured, $N_{max}^{res}=3$.

Optionally, the information related to resource allocation may include information indicated in SCI. For example, the information indicated in the SCI is information indicated in the $1^{st}$-stage SCI, or information indicated in the $2^{nd}$-stage SCI, or information jointly indicated in the $1^{st}$-stage SCI and the $2^{nd}$-stage SCI, wherein:

Optionally, the $1^{st}$-stage SCI is determined by detecting (or receiving, for example, including steps such as channel estimation and/or demodulation and/or decoding) a PSCCH carrying the $1^{st}$-stage SCI.

Optionally, the frequency resource allocation indication value FRIV is determined according to a "frequency resource assignment" field in the $1^{st}$-stage SCI. For example, the value of the "frequency resource assignment" field in the $1^{st}$-stage SCI is used as the frequency resource allocation indication value FRIV. For another example, the "frequency resource assignment" field in the 1-stage SCI consists of the frequency resource allocation indication value FRIV. For another example, the "frequency resource assignment" field in the $1^{st}$-stage SCI includes the frequency resource allocation indication value FRIV, wherein:

Optionally, if $N_{max}^{res}=2$, then the size of the "frequency resource assignment" field in the $1^{st}$-stage SCI may be $$\left\lceil \log_2\left(\frac{N_{subChannel}^{SL}(N_{subChannel}^{SL}+1)}{2}\right)\right\rceil$$

bits.

Optionally, if $N_{max}^{res}=3$, then the size of the "frequency resource assignment" field in the $1^{st}$-stage SCI may be $$\left\lceil \log_2\left(\frac{N_{subChannel}^{SL}(N_{subChannel}^{SL}+1)(2N_{subChannel}^{SL}+1)}{6}\right)\right\rceil$$

Optionally, the time resource allocation indication value TRIV is determined according to a "time resource assignment" field in the $1^{st}$-stage SCI. For example, the value of the "time resource assignment" field in the $1^{st}$-stage SCI is used as the time resource allocation indication value TRIV. For another example, the "time resource assignment" field in the $1^{st}$-stage SCI consists of the time resource allocation indication value TRIV. For another example, the "time resource assignment" field in the $1^{st}$-stage SCI includes the time resource allocation indication value TRIV, wherein:

Optionally, if $N_{max}^{res}=2$, then the size of the "time resource assignment" field in the $1^{st}$-stage SCI may be 5 bits.

Optionally, if $N_{max}^{res}=3$, then the size of the "time resource assignment" field in the $1^{st}$-stage SCI may be 9 bits.

In addition, optionally, in step S103, one or more time/frequency resources are determined. For example, $N_{indicated}^{res}$ time/frequency resources are determined, and are respectively referred to as "time/frequency resource 1," "time/frequency resource 2," . . . , "time/frequency resource $N_{indicated}^{res}$" in a chronological order. A slot where a time/frequency resource i ($1 \leq i \leq N_{indicated}^{res}$) is located, a starting sub-channel of the time/frequency resource i, and the number of sub-channels occupied by the time/frequency resource i are respectively a slot $t_i$, a sub-channel $f_i$, and m, wherein:

Optionally, the $N_{indicated}^{res}$ time/frequency resources occupy the same number of sub-channels (that is, all of the numbers are equal to m).

Optionally, the $N_{indicated}^{res}$ time/frequency resources may be time/frequency resources in the resource pool P.

Optionally, $N_{indicated}^{res} \geq 1$.

Optionally, $N_{indicated}^{res} \leq N_{max}^{res}$.

Optionally, $N_{indicated}^{res}$ is always equal to 1.

Optionally, $N_{indicated}^{res}$ is always equal to $N_{max}^{res}$.

Optionally, $m \geq 1$.

Optionally, $m \leq N_{subChannel}^{SL}$.

Optionally, $t_1 < t_2 < \ldots < t_{N_{indicated}^{res}}$.

Optionally, $t_1 \leq t_2 \leq \ldots \leq t_{N_{indicated}^{res}}$.

Optionally, for a time/frequency resource i ($1 \leq i \leq N_{indicated}^{res}$), $f_i \geq 0$.

Optionally, for a time/frequency resource i ($1 \leq i \leq N_{indicated}^{res}$), $f_i \leq N_{subChannel}^{SL} - 1$.

Optionally, slots $t_i, t_2, \ldots, t_{N_{indicated}^{res}}$ may be located in a time resource allocation window starting from the slot $t_1$ and having a length of W slots, wherein:

Optionally, the W slots may include only slots in the resource pool P (for example, there may be zero, one, or more slots not belonging to the resource pool P between the first slot and the second slot in the W slots).

Optionally, the W slots may include the slots in the resource pool P and slots not belonging to the resource pool P.

Optionally, slots $t_2, \ldots, t_{N_{indicated}^{res}}$ may be respectively represented by offsets thereof relative to the slot $t_1$ (for example, an offset relative to the slot $t_1$ in the resource pool P), such as respectively denoted as: $\Delta t_{2,1} = t_2 - t_1, \ldots, \Delta t_{N_{indicated}^{res},1} = t_{N_{indicated}^{res}} - t_1$. In this case, when the context is clear, $\Delta t_{i,1}$ may be used to represent $t_i$, or $t_i$ ($2 \leq i \leq N_{indicated}^{res}$) may be determined by determining $\Delta t_{i,1}$. Optionally, in this case, it may be considered that $t_1 = 0$. For example, if $\Delta t_{2,1} = 1$, then the slot $t_2$ may be the next slot immediately following the slot $t_1$ in the resource pool P.

Optionally, if $N_{indicated}^{res} > 2$ and if a time/frequency resource i ($2 \leq i \leq N_{indicated}^{res}$) is allocated, then a time/frequency resource (i−1) is necessarily allocated.

Optionally, a PSCCH (denoted as $PSCCH_1$) carrying the $1^{st}$-stage SCI and/or a PSSCH (denoted as $PSSCH_1$) associated with $PSCCH_1$ is transmitted on the time/frequency resource 1, wherein:

Optionally, $t_1$ and/or $f_1$ is determined according to the PSCCH (denoted as $PSCCH_1$) carrying the 1a-stage SCI. For example, a slot where $PSCCH_1$ is located is determined by detecting (or receiving, for example, including steps such as channel estimation and/or demodulation and/or decoding) $PSCCH_1$, and then it is determined that $t_1$ is equal to the slot where $PSCCH_1$ is located. For another example, a sub-channel where a starting PRB of $PSCCH_1$ is located is determined by detecting (or receiving, for example, including steps such as channel estimation and/or demodulation and/or decoding) $PSCCH_1$, and then it is determined that $f_1$ is equal to the sub-channel where the starting PRB of $PSCCH_1$ is located, wherein:

Optionally, the starting PRB of $PSCCH_1$ is a starting PRB of the sub-channel $f_1$.

Optionally, the $N_{indicated}^{res}$ time/frequency resources may be referred to as "assigned" time/frequency resources.

Optionally, among the $N_{indicated}^{res}$ time/frequency resources, time/frequency resources other than the time/frequency resource 1, namely "time/frequency resource 2," . . . , "time/frequency resource $N_{indicated}^{res}$," may be referred to as reserved time/frequency resources. For example, if $N_{indicated}^{res} = 1$, then there is no reserved time/frequency resource. For another example, if $N_{indicated}^{res} = 2$, then there is one reserved time/frequency resource.

Optionally, $N_{indicated}^{res}$ and/or other time-domain parameter(s) (for example, a slot $t_2$ where the time/frequency resource 2 is located (for example, when $N_{indicated}^{res} = 2$, or when $N_{indicated}^{res} = 3$), or a slot $t_3$ where the time/frequency resource 3 is located (for example, when $N_{indicated}^{res} = 3$)) is determined according to the time resource allocation indication value TRIV, wherein:

Optionally, $t_2$ is determined by determining $\Delta t_{2,1}$ (or $\Delta t_{2,1}$ is used to represent $t_2$).

Optionally, $t_3$ is determined by determining $\Delta t_{3,1}$ (or $\Delta t_{3,1}$ is used to represent $t_3$).

Optionally, one or more values (for example, {0}, or {$C_{10}$}, where $C_{10}$ may be the value of any element in a set $S_1$) of the time resource allocation indication value TRIV correspond to $N_{indicated}^{res} = 1$, wherein:

Optionally, the correspondence holds for $N_{max}^{res} = 1$.
  Optionally, the correspondence holds for $N_{max}^{res} = 2$.
  Optionally, the correspondence holds for $N_{max}^{res} = 3$.
  Optionally, the slot $t_2$ does not exist in this case.
  Optionally, the slot $t_3$ does not exist in this case.

Optionally, one or more values (for example, (1, 2, ..., W−1), or ($C_{20}+1, C_{20}+2, \ldots, C_{20}+W-1$), where $C_{20}$ may be the value of any element in the set $S_1$) of the time resource allocation indication value TRIV correspond to $N_{indicated}^{res} = 2$, wherein:

Optionally, the correspondence holds for $N_{max}^{res} = 2$.
  Optionally, the correspondence holds for $N_{max}^{res} = 3$.
  Optionally, the time resource allocation indication value TRIV may be used to indicate the slot $t_2$ (for example, represented by $\Delta t_{2,1}$) where the time/frequency resource 2 is located. For example, TRIV=1 may indicate that the slot $t_2$ is the next slot immediately following the slot $t_1$ in the resource pool P. For another example, TRIV=v may be used to indicate $\Delta t_{2,1} = v$ (v=1, 2, ..., W−1). For another example, TRIV=v may be used to indicate $\Delta t_{2,1} = v - C_{20}$ (v−$C_{20}$=1, 2, ..., W−1).
  Optionally, the slot $t_3$ does not exist in this case.

Optionally, one or more values (for example, {W, W+1, ..., W+($\Sigma_{j=1}^{W-2}$j)−1}, or {$C_{30}$+W, $C_{30}$+W+1, ..., $C_{30}$+W+($\Sigma_{j=1}^{W-2}$−j)−1}, where $C_{30}$ may be the value of any element in the set $S_1$) of the time resource allocation indication value TRIV correspond to $N_{indicated}^{res} = 3$.

Optionally, the correspondence holds for $N_{max}^{res} = 3$.
  Optionally, the time resource allocation indication value TRIV may be used to indicate the slot $t_2$ where the time/frequency resource 2 is located and the slot $t_3$ where the time/frequency resource 3 is located. For example, TRIV=TRIV'+$\Delta_T$, where TRIV' can be defined as follows:

if time domain allocation condition 1 is met, then
 TRIV' = $T_1 + \Delta_{T,1}$
otherwise
 TRIV' = $T_2 + \Delta_{T,2}$ wherein:
  Optionally, $\Delta_T$ can be defined according to any one of the following methods:
    $\Delta_T = C_{100}$.
    $\Delta_T = W + C_{100}$.
  wherein:
    Optionally, $C_{100}$ may be the value of any element in the set $S_1$.
  Optionally, $\Delta_{T,2}$ can be defined according to any one of the following methods:
    $\Delta_{T,1} = C_{110}$.
    $\Delta_{T,1} = W + C_{110}$.

wherein:
Optionally, $C_{110}$ may be the value of any element in the set $S_1$.
Optionally, $\Delta_{T,2}$ can be defined according to any one of the following methods:
$\Delta_{T,2}=C_{120}$.
$\Delta_{T,2}=W+C_{120}$.
wherein:
Optionally, $C_{120}$ may be the value of any element in the set $S_1$.
Optionally, "time domain allocation condition 1" can be defined as any one of the following conditions:
$(\Delta t_{2,1}-C_{130})\leq \lfloor(W-C_{331})/C_{132}\rfloor$.
$(\Delta t_{3,1}-C_{130})\leq \lfloor(W-C_{331})/C_{132}\rfloor$.
$(\Delta t_{2,1}-C_{130})>\lfloor(W-C_{331})/C_{132}\rfloor$.
$(\Delta t_{3,1}-C_{130})>\lfloor(W-C_{331})/C_{132}\rfloor$.
wherein:
Optionally, each of $C_{130}$, $C_{131}$, and $C_{132}$ may be the value of any element in the set $S_1$.
Optionally, $T_1$ can be defined according to any one of the following methods:
$T_1=30\cdot(\Delta t_{2,1}-1)+(31-\Delta t_{3,1})$.
$T_1=30\cdot \Delta t_{2,1}-\Delta t_{3,1}+1$.
$T_1=(W-C_{140})\cdot(\Delta t_{2,1}-C_{141})+((W-C_{142})-\Delta t_{3,1})$.
$T_1=(W-C_{140})-\Delta t_{2,1}-\Delta t_{3,1}+C_{143}$.
$T_1=C_{144}\cdot \Delta t_{2,1}-C_{145}\cdot \Delta t_{3,1}+C_{146}$.
$T_1=30\cdot(30-\Delta t_{2,1}+1)+(30-1-(31-\Delta t_{3,1}))$.
$T_1=928-30\cdot \Delta t_{2,1}+\Delta t_{3,1}$.
$T_1=(W-C_{140})\cdot((W-C_{140})-\Delta t_{2,1}+C_{147})+((W-C_{140})-C_{148}-((W-C_{142})-\Delta t_{3,1}))$.
$T_1=(W-C_{140})\cdot(W-C_{140})-C_{149}-(W-C_{140})\cdot \Delta t_{2,1}+\Delta t_{3,1}$.
$T_1=30\cdot(\Delta t_{3,1}-1)+(31-\Delta t_{2,1})$.
$T_1=30\cdot \Delta t_{3,1}-\Delta t_{2,1}+1$.
$T_1=(W-C_{140})\cdot(\Delta t_{3,1}-C_{141})+((W-C_{142})-\Delta t_{2,1})$.
$T_1=(W-C_{140})-\Delta t_{3,1}-\Delta t_{2,1}+C_{143}$.
$T_1=C_{144}-\Delta t_{3,1}-C_{145}\, \Delta t_{2,1}+C_{146}$.
$T_1=30\cdot(30-\Delta t_{3,1}+1)+(30-1-(31-\Delta t_{2,1}))$.
$T_1=928-30\, \Delta t_{3,1}+\Delta t_{2,1}$.
$T_1=(W-C_{140})\cdot((W-C_{140})-\Delta t_{3,1}+C_{147})+((W-C_{140})-C_{148}-((W-C_{142})-\Delta t_{2,1}))$.
$T_1=(W-C_{140})\cdot(W-C_{140})-C_{149}-(W-C_{140})-\Delta t_{3,1}+\Delta t_{2,1}$.
wherein:
Optionally, each of $C_{140}$, $C_{141}$, $C_{142}$, $C_{143}$, $C_{144}$, $C_{145}$, $C_{146}$, $C_{147}$, $C_{148}$, and $C_{149}$ may be the value of any element in the set $S_1$.
Optionally, $T_2$ can be defined according to any one of the following methods:
$T_2=30\cdot(\Delta t_{2,1}-1)+(31-\Delta t_{3,1})$.
$T_2=30\cdot \Delta t_{2,1}-\Delta t_{3,1}+1$.
$T_2=(W-C_{150})\cdot(\Delta t_{2,1}-C_{151})+((W-C_{152})-\Delta t_{3,1})$.
$T_2=(W-C_{150})\cdot \Delta t_{2,1}-\Delta t_{3,1}+C_{153}$.
$T_2=C_{154}\cdot \Delta t_{2,1}-C_{155}\cdot \Delta t_{3,1}+C_{156}$.
$T_2=30\cdot(30-\Delta t_{2,1}+1)+(30-1-(31-\Delta t_{3,1}))$.
$T_2=928-30\cdot \Delta t_{2,1}+\Delta t_{3,1}$.
$T_2=(W-C_{150})\cdot((W-C_{150})-\Delta t_{2,1}+C_{157})+((W-C_{150})-C_{158}-((W-C_{152})-\Delta t_{3,1}))$.
$T_2=(W-C_{150})\cdot(W-C_{150})-C_{159}-(W-C_{150})\cdot \Delta t_{2,1}+\Delta t_{3,1}$.
$T_2=30\cdot(\Delta t_{3,1}-1)+(31-\Delta t_{2,1})$.
$T_2=30\cdot \Delta t_{3,1}-\Delta t_{2,1}+1$.
$T_2=(W-C_{150})\cdot(\Delta t_{3,1}-C_{151})+((W-C_{152})-\Delta t_{2,1})$.
$T_2=(W-C_{150})-\Delta t_{3,1}-\Delta t_{2,1}+C_{153}$.
$T_2=C_{154}\cdot \Delta t_{3,1}-C_{155}\cdot \Delta t_{2,1}+C_{156}$.
$T_2=30\cdot(30-\Delta t_{3,1}+1)+(30-1-(31-\Delta t_{2,1}))$.
$T_2=928-30-\Delta t_{3,1}+\Delta t_{2,1}$.
$T_2=(W-C_{150})\cdot((W-C_{150})-\Delta t_{3,1}+C_{157})+((W-C_{150})-C_{158}-((W-C_{152})-\Delta t_{2,1}))$.
$T_2=(W-C_{150})\cdot(W-C_{150})-C_{159}-(W-C_{150})\cdot \Delta t_{3,1}+\Delta t_{2,1}$.
wherein:
Each of $C_{150}$, $C_{151}$, $C_{152}$, $C_{153}$, $C_{154}$, $C_{155}$, $C_{156}$, $C_{157}$, $C_{158}$, and $C_{159}$ may be the value of any element in the set $S_1$.

For example, TRIV=TRIV'+W, where TRIV' can be defined as follows:

if $(\Delta t_{2,1} - 1) \leq \lfloor(W - 2)/2\rfloor$, then
  TRIV' = $(W - 2) \cdot (\Delta t_{2,1} - 1) + ((W - 1) - \Delta t_{3,1})$
otherwise
  TRIV' = $(W - 2) \cdot ((W - 2) - \Delta t_{2,1} + 1)$
  $+ ((W - 2) - 1 - ((W - 1) - \Delta t_{3,1}))$ For another example, TRIV can be defined as follows:

if $(\Delta t_{2,1} - 1) \leq \lfloor(W - 2)/2\rfloor$, then
  TRIV = $(W - 2) \cdot (\Delta t_{2,1} - 1) + ((W - 1) - \Delta t_{3,1})$
  $+ W$
otherwise
  TRIV $(W - 2) \cdot ((W - 2) - \Delta t_{2,1} + 1)$
  $+ ((W - 2) - 1 - ((W - 1) - \Delta t_{3,1}))$
  $+ W$ For another example, TRIV=TRIV'+W, where TRIV' can be defined as follows:

if $(\Delta t_{2,1} - 1) \leq \lfloor(W - 2)/2\rfloor$, then
  TRIV' = $(W - 2) \cdot \Delta t_{2,1} - \Delta t_{3,1} + 1$
otherwise
  TRIV' = $W^2 - 3 \cdot W - (W - 2) \cdot \Delta t_{2,1} + \Delta t_{3,1}$ For another example, TRIV can be defined as follows:

if $(\Delta t_{2,1} - 1) \leq \lfloor(W - 2)/2\rfloor$, then
  TRIV = $(W - 2) \cdot \Delta t_{2,1} - \Delta t_{3,1} + 1 + W$
otherwise
  TRIV = $W^2 - 2 \cdot W - (W - 2) \cdot \Delta t_{2,1} + \Delta t_{3,1}$ For another example, TRIV=TRIV'+W. For TRIV', the following definition of RIV (for example, the definition of RIV in uplink resource allocation type 1, or the definition of RIV in downlink resource allocation type 1) can be used, where $L_{RBS}$ is replaced with $\Delta t_{2,1}$, $RB_{start}$ is replaced with $(W-1)-\Delta t_{3,1}$, and $N_{BWP}^{size}$ is replaced with $(W-2)$:

if $(L_{RBs} - 1) \leq \lfloor N_{BWP}^{size}/2 \rfloor$, then
  RIV = $N_{BWP}^{size} \cdot (L_{RBs} - 1) + RB_{start}$
otherwise
  RIV = $N_{BWP}^{size} \cdot (N_{BWP}^{size} - L_{RBs} + 1)$
  $+ (N_{BWP}^{size} - 1 - RB_{start})$,
where $L_{RBs} \geq 1$ and $L_{RBs}$ does not exceed $N_{BWP}^{size} - RB_{start}$ For another example, TRIV=TRIV'+32, where TRIV' can be defined as follows:

$$\text{if } (\Delta t_{2,1} - 1) \leq \lfloor 30/2 \rfloor, \text{ then}$$
$$\text{TRIV'} = 30 \cdot (\Delta t_{2,1} - 1) + (31 - \Delta t_{3,1})$$
$$\text{otherwise}$$
$$\text{TRIV'} = 30 \cdot (30 - \Delta t_{2,1} + 1) + (30 - 1 - (31 - \Delta t_{3,1}))$$

For another example, TRIV can be defined as follows:

$$\text{if } (\Delta t_{2,1} - 1) \leq \lfloor 30/2 \rfloor, \text{ then}$$
$$\text{TRIV} = 30 \cdot (\Delta t_{2,1} - 1) + (31 - \Delta t_{3,1}) + 32$$
$$\text{otherwise}$$
$$\text{TRIV} = 30 \cdot (30 - \Delta t_{2,1} + 1)$$
$$+ (30 - 1 - (31 - \Delta t_{3,1})) + 32$$

For another example, TRIV=TRIV'+32, where TRIV' can be defined as follows:

$$\text{if } (\Delta t_{2,1} - 1) \leq 15, \text{ then}$$
$$\text{TRIV'} = 30 \cdot (\Delta_{2,1} - 1) + (31 - \Delta t_{3,1})$$
$$\text{otherwise}$$
$$\text{TRIV'} = 30 \cdot (31 - \Delta t_{2,1}) + (\Delta t_{3,1} - 2)$$

For another example, TRIV can be defined as follows:

$$\text{if } (\Delta t_{2,1} - 1) \leq 15, \text{ then}$$
$$\text{TRIV} = 30 \cdot (\Delta t_{2,1} - 1) + (31 - \Delta t_{3,1}) + 32$$
$$\text{otherwise}$$
$$\text{TRIV} = 30 \cdot (31 - \Delta t_{2,1}) + (\Delta t_{3,1} - 2) + 32$$

For another example, TRIV=TRIV'+32, where TRIV' can be defined as follows:

$$\text{if } (\Delta t_{2,1} - 1) \leq 15, \text{ then}$$
$$\text{TRIV'} = 30 \cdot \Delta t_{2,1} - \Delta t_{3,1} + 1$$
$$\text{otherwise}$$
$$\text{TRIV'} = 928 - 30 \cdot \Delta t_{2,1} + \Delta t_{3,1}$$

For another example, TRIV can be defined as follows.

$$\text{if } (\Delta t_{2,1} - 1) \leq 15, \text{ then}$$
$$\text{TRIV} = 30 \cdot \Delta t_{2,1} - \Delta t_{3,1} + 33$$
$$\text{otherwise}$$
$$\text{TRIV} = 960 - 30 \cdot \Delta t_{2,1} + \Delta t_{3,1}$$

For another example, TRIV=TRIV'+32. For TRIV', the following definition of RIV (for example, the definition of RIV in uplink resource allocation type 1, or the definition of RIV in downlink resource allocation type 1) can be used, where $L_{RBS}$ is replaced with $\Delta t_{2,1}$, $RB_{start}$ is replaced with $31 - \Delta t_{3,1}$, and $N_{BWP}^{size}$ replaced with 30:

$$\text{if } (L_{RBs} - 1) \leq \lfloor N_{BWP}^{size}/2 \rfloor, \text{ then}$$
$$\text{RIV} = N_{BWP}^{size} \cdot (L_{RBs} - 1) + RB_{start}$$
$$\text{otherwise}$$
$$\text{RIV} = N_{BWP}^{size} \cdot (N_{BWP}^{size} - L_{RBs} + 1)$$
$$+ (N_{BWP}^{size} - 1 - RB_{start}),$$
$$\text{where } L_{RBs} \geq 1 \text{ and } L_{RBs} \text{ does not exceed } N_{BWP}^{size} - RB_{start}$$

Optionally, the number m of sub-channels occupied by each time/frequency resource (for example, each allocated time/frequency resource, such as the time/frequency resource 1) and/or other frequency-domain parameter(s) (for example, a starting sub-channel $f_2$ of the time/frequency resource 2 (for example, when $N_{max}^{res}=2$, or when $N_{max}^{res}=3$), or a starting sub-channel $f_3$ of the time/frequency resource 3 (for example, when $N_{max}^{res}=3$)) is determined according to the frequency resource allocation indication value FRIV, wherein:

Optionally, if $N_{max}=2$, then the values of m and $f_2$ are determined according to the frequency resource allocation indication value FRIV, wherein:

Optionally, FRIV can be defined as follows:

$$\text{FRIV} = f_2 + \Delta_{F,2}$$

wherein.

Optionally, $\Delta_{F,2} = \sum_{i=1}^{m-1}(N_{subChannel}^{SL}+1-i)_{N_{max}^{res}-1}$.

Optionally, if $1 < m \leq N_{subChannel}^{SL}{}_{res}$, then $\Delta_{F,2} = \sum_{i=1}^{m-1}(N_{subChannel}^{SL}+1-i)^{N_{max}^{res}-1}$.

Optionally, if m=1, then $\Delta_{F,2}=0$.

Optionally, if m>1, then $\Delta_{F,2} = \sum_{i=1}^{m-1}(N_{subChannel}^{SL}+1-i)^{N_{max}^{res}-1}$.

Optionally, if m≠1, then $\Delta_{F,2} = \sum_{i=1}^{m-1}(N_{subChannel}^{SL}+1-i)^{N_{max}^{res}-1}$.

Optionally, if $1 < m \leq N_{subChannel}^{SL}{}_{res}$, then $\Delta_{F,2} = \sum_{i=1}^{m-1}(N_{subChannel}^{SL}+1-i)^{N_{max}^{res}-1}$, otherwise $\Delta_{F,2}=0$.

Optionally, if m>1, then $\Delta_{F,2} = \sum_{i=1}^{m-1}(N_{subChannel}^{SL}+1-i)^{N_{max}^{res}-1}$, otherwise $\Delta_{F,2}=0$.

Optionally, if m≠1, then $\Delta_{F,2} = \sum_{i=1}^{m-1}(N_{subChannel}^{SL}+1-i)^{N_{max}^{res}-1}$, otherwise $\Delta_{F,2}=0$.

Optionally, if m=1, then $\Delta_{F,2}=0$, otherwise $\Delta_{F,2} = \sum_{i=1}^{m-1}(N_{subChannel}^{SL}+1-i)^{N_{max}^{res}-1}$.

wherein:

Optionally, in any of the above expressions, "$(N_{subChannel}^{SL}+1-i)^{N_{max}^{res}-1}$." can be replaced with "$(N_{subChannel}^{SL}+1-i)$".

Optionally, FRIV can be defined as follows $$\text{if } (m - 1) \leq \lfloor N_{subChannel}^{SL}/2 \rfloor, \text{ then}$$
$$\text{FRIV} = N_{subChannel}^{SL} \cdot (m - 1) + f_2$$
$$\text{otherwise}$$
$$\text{FRIV} = N_{subChannel}^{SL} \cdot (N_{subChannel}^{SL} - m + 1) + (N_{subChannel}^{SL} - 1 - f_2)$$

Optionally, if $N_{max}=3$, then the values of m, $f_2$, and $f_3$ are determined according to the frequency resource allocation indication value FRIV, wherein:

Optionally, FRIV can be defined as follows:

$$\text{FRIV} = f_2 \cdot (N_{subChannel}^{SL} + 1 - m) + f_3 + \Delta_{F,3}$$

Alternatively, FRIV is defined as follows:

$$\text{FRIV} = f_3 \cdot (N_{subChannel}^{SL} + 1 - m) + f_2 + \Delta_{F,3}$$

wherein:

Optionally, $\Delta_{F,3} = \sum_{i=1}^{m-1}(N_{subChannel}^{SL}+1-i)^{N_{max}^{res}-1}$.

Optionally, if $1 < m \leq N_{subChannel}^{SL}$, then $\Delta_{F,3} = \sum_{i=1}^{m-1}(N_{subChannel}^{SL}+1-i)^{N_{max}^{res}-1}$.

Optionally, if m=1, then $\Delta_{F,3}=0$.
Optionally, if m>1, then $\Delta_{F,3}=\Sigma_{i=1}^{m-1}(N_{subChannel}^{SL}+1-i)^{N_{max}^{res}-1}$.
Optionally, if m≠1, then $\Delta_{F,3}=\Sigma_{i=1}^{m-1}(N_{subChannel}^{SL}+1-i)^{N_{max}^{res}-1}$.
Optionally, if $1<m\leq N_{subChannel}^{SL}$, then $\Delta_{F,3}=\Sigma_{i=1}^{m-1}(N_{subChannel}^{SL}+1-i)^{N_{max}^{res}-1}$, otherwise $\Delta_{F,3}=0$.
Optionally, if m>1, then $\Delta_{F,3}=\Sigma_{i=1}^{m-1}(N_{subChannel}^{SL}+1-i)^{N_{max}^{res}-1}$, otherwise $\Delta_{F,3}=0$.
Optionally, if m≠1, then $\Delta_{F,3}=\Sigma_{i=1}^{m-1}(N_{subChannel}^{SL}+1-i)^{N_{max}^{res}-1}$, otherwise $\Delta_{F,3}=0$.
Optionally, if m=1, then $\Delta_{F,3}=0$, otherwise $\Delta_{F,3}=\Sigma_{i=1}^{m-1}(N_{subChannel}^{SL}+1-i)^{N_{max}^{res}-1}$.
wherein:
Optionally, in any of the above expressions, "$(N_{subChannel}^{SL}+1-i)^{N_{max}^{res}-1}$," can be replaced with "$(N_{subChannel}^{SL}+1-i)^2$".
Optionally, if $N_{max}=2$, then the values of m and $f_2$ are determined according to the frequency resource allocation indication value FRIV, and if $N_{max}=3$, then the values of m, $f_2$, and $f_3$ are determined according to the frequency resource allocation indication value FRIV, wherein:
Optionally, FRIV can be defined as follows:

$$FRIV = \begin{cases} f_2 \cdot (N_{subChannel}^{SL} + 1 - m) + f_3 + \Delta_F & \text{for } N_{max}^{res} = 3 \\ f_2 + \Delta_F & \text{for } N_{max}^{res} = 2 \end{cases}$$

Alternatively, FRIV is defined as follows:

$$FRIV = \begin{cases} f_3 \cdot (N_{subChannel}^{SL} + 1 - m) + f_2 + \Delta_F & \text{for } N_{max}^{res} = 3 \\ f_2 + \Delta_F & \text{for } N_{max}^{res} = 2 \end{cases}$$

wherein:
Optionally, $\Delta_F=\Sigma_{i=1}^{m-1}(N_{subChannel}^{SL}+1-i)^{N_{max}^{res}-1}$.
Optionally, if $1<m\leq N_{subChannel}^{SL}$, then $\Delta_F=\Sigma_{i=1}^{m-1}(N_{subChannel}^{SL}+1-i)^{N_{max}^{res}-1}$.
Optionally, if m=1, then $\Delta_F=0$.
Optionally, if m>1, then $\Delta_F=\Sigma_{i=1}^{m-1}(N_{subChannel}^{SL}+1-i)^{N_{max}^{res}-1}$.
Optionally, if m≠1, then $\Delta_F=\Sigma_{i=1}^{m-1}(N_{subChannel}^{SL}+1-i)^{N_{max}^{res}-1}$.
Optionally, if $1<m\leq N_{subChannel}^{SL}$, then $\Delta_F=\Sigma_{i=1}^{m-1}(N_{subChannel}^{SL}+1-i)^{N_{max}^{res}-1}$, otherwise $\Delta_F=0$.
Optionally, if m>1, then $\Delta_4=\Sigma_{i=1}^{m-1}(N_{subChannel}^{SL}+1-i)^{N_{max}^{res}-1}$, otherwise $\Delta_F=0$.
Optionally, if m≠1, then $\Delta_F=\Sigma_{i=1}^{m-1}(N_{subChannel}^{SL}+1-i)^{N_{max}^{res}-1}$, otherwise $\Delta_F=0$.
Optionally, if m=1, then $\Delta_F=0$, otherwise $F=\Sigma_{i=1}^{m-1}-1(N_{subChannel}^{SL}+1-i)^{N_{max}^{res}-1}$.
Optionally, if $N_{max}^{res}=2$ and if $N_{indicated}^{res}=1$, then the determined value of $f_2$ does not indicate a starting sub-channel of any time/frequency resource (for example, the determined value of $f_2$ can be ignored in this case). In this case,
Optionally, a given value of m may correspond to one or more FRIVs. For example, for a given value of m (denoted as $m_0$), the one or more FRIVs are FRIVs determined according to $m=m_0$ and $f_2=F_{2,0}$, where $F_{2,0}$ may be the value of one or more elements in a set $\{0, 1, \ldots, N_{subChannel}^{SL}-m_0\}$.

Optionally, a given value of m corresponds to an FRIV. For example, for a given value of m (denoted as $m_0$), the FRIV is an FRIV corresponding to $m=m_0$ and $f_2=F_{2,1}$, where $F_{2,1}$ is equal to the value of a predefined or configured or pre-configured element in the set $\{0, 1, \ldots, N_{subChannel}^{SL}-m_0\}$. For example, $F_{2,1}=0$, and for another example, $F_{2,1}=N_{subChannel}^{SL}-m_0$. In this case, optionally, an FRIV corresponding to $m=m_0$ and $f_2*F_{2,1}$ (for example, when $F_{2,1}=0$, an FRIV corresponding to $m_0$ and $f_2$="the value of any element in a set $\{1, \ldots, N_{subChannel}^{SL}-m_0\}$") can be reserved (for example, for use in a future protocol version).
Optionally, if $N_{max}^{res}=3$ and if $N_{indicated}^{res}=1$, then the determined values of $f_2$ and $f_3$ do not indicate a starting sub-channel of any time/frequency resource (for example, the determined values of $f_2$ and $f_3$ can be ignored in this case). In this case, a Optionally, a given value of m may correspond to one or more FRIVs.
For example, for a given value of m (denoted as $m_0$), the FRIV is an FRIV corresponding to $m=m_0$, $f_2=F_{2,2}$, and $f_3=F_{3,0}$, where each of $F_{2,2}$ and $F_{3,0}$ may be the value of any element in the set $\{0, 1, \ldots, N_{subChannel}^{SL}-m_0\}$.
Optionally, a given value of m corresponds to an FR/V. For example, for a given value of m (denoted as $m=m_0$), the FRIV is an FRIV corresponding to $m_0$, $f_2=F_{2,3}$, and $f_3=F_{3,1}$, where each of $F_{2,3}$ and $F_{3,1}$ is equal to the value of a predefined or configured or pre-configured element in the set $\{0, 1, \ldots, N_{subChannel}^{SL}-m_0\}$. For example, $F_{2,3}=0$, and $F_{3,1}=0$. For another example, $F_{2,3}=N_{subChannel}^{SL}-m_0$, and $F_{3,1}=N_{subChannel}^{SL}-m_0$. For another example, $F_{2,3}=0$, and $F_{3,1}=N_{subChannel}^{SL}-m_0$. For another example, $F_{2,3}=N_{subChannel}^{SL}-m_0$, and $F_{3,1}=0$. In this case, optionally, an FRIV corresponding to $m=m_0$, $f_2*F_{2,3}$, and $f_3 \neq F_{3,1}$ (for example, when $F_{2,3}=0$ and $F_{3,1}=0$, an FRIV corresponding to $m=m_0$, $f_2$="the value of any element in the set $\{1, \ldots, N_{subChannel}^{SL}-m_0\}$)," and $f_3$="the value of any element in the set $\{1, \ldots, N_{subChannel}^{SL}-m_0\}$") can be reserved (for example, for use in a future protocol version).
Optionally, if $N_{max}=3$ and if $N_{indicated}^{res}=2$, then the determined value of $f_3$ does not indicate a starting sub-channel of any time/frequency resource (for example, the determined value of f can be ignored in this case). In this case,
Optionally, a given value of m and a given value of $f_2$ may correspond to one or more FRIVs. For example, for a combination of a given value of m (denoted as $m_0$) and a given value of $f_2$ (denoted as $f_{2,4}$), the FRIV is an FR/V corresponding to $m=m_0$, $f_2=f_{2,4}$, and $f_3=F_{3,2}$, where $F_{3,2}$ may be the value of one or more elements in the set $\{0, 1, \ldots, N_{subChannel}^{SL}-m_0\}$.
Optionally, a given value of m and a given value of $f_2$ correspond to an FRIV. For example, for a given value of m (denoted as $m_0$) and a given value of $f_2$ (denoted as $f_{2,4}$), the FR/V is an FRIV corresponding to m, $f_{2,4}$, and $f_3=F_{3,3}$, where $F_{3,3}$ is equal to the value of a predefined or configured or pre-configured element in the set $\{0, 1, \ldots, N_{subChannel}^{SL}-m_0\}$. For example, $F_{3,3}=0$, and for another example, $F_{3,3}=N_{subChannel}^{SL}-m_0$. In this case, optionally, an FRIV corresponding to m=m$_0$, f$_2$=f$_{2,4}$, and f$_3$≠F$_{3,3}$ (for example, when F$_{3,3}$=0, an FR/V corresponding to m=m$_0$, f$_2$=f$_{2,4}$, and f$_3$="the value of any element in the set {1, . . . , N$_{subChannel}^{SL}$−m$_0$}") can be reserved (for example, for use in a future protocol version).

Figure 3:
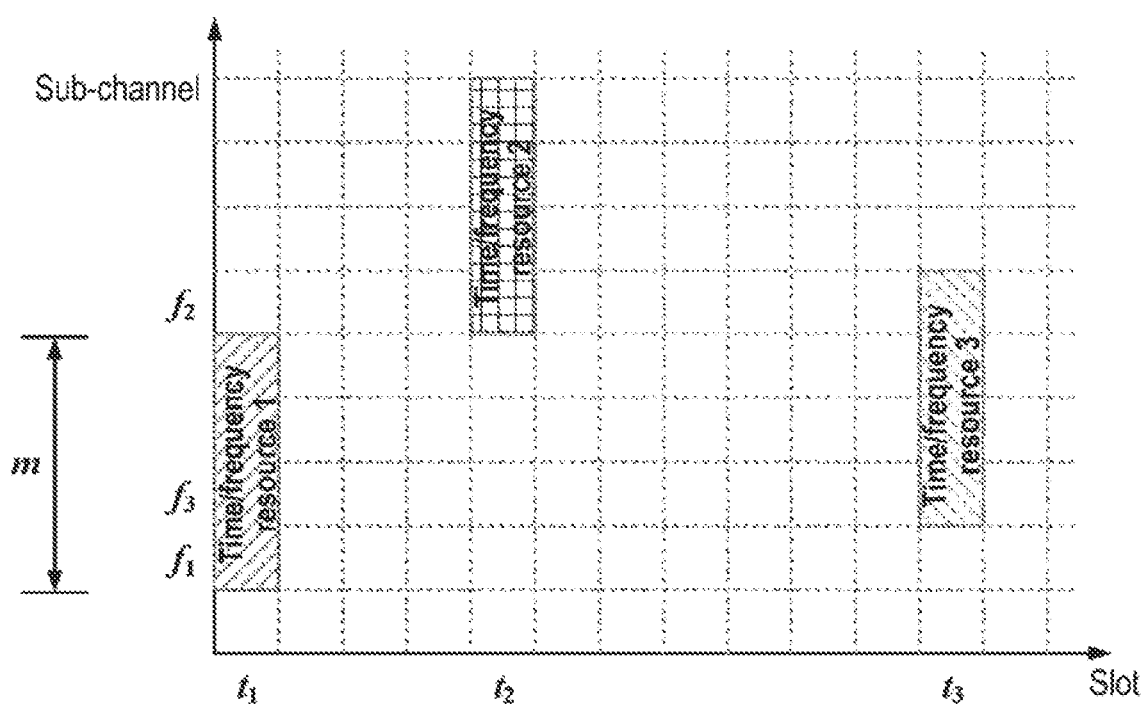
FIG. 3 is an example showing parameters of respective time/frequency resources allocated by means of a method performed by user equipment according to Embodiment 1 of the present invention.

FIG. 3 is an example showing respective parameters of a time/frequency resource 1, a time/frequency resource 2, and a time/frequency resource 3 when N$_{max}^{res}$=3 and when N$_{indicated}^{res}$=3.

Optionally, in Embodiment 1 of the present invention, the set S$_l$ may be equal to any one of the following sets, or may be equal to a union of any two or more of the following sets:

{0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, −1, −2, −3, −4, −5, −6, −7, −8, −9, −10, −11, −12, −13, −14, −15, −16, −17, −18, −19, −20, −21, −22, −23, −24, −25, −26, −27, −28, −29, −30, −31, −32, −33, −34, −35, −36}.

{784, 812, 840, 841, 868, 870, 896, 899, 900, 924, 928, 930, 952, 957, 960, 961, 980, 986, 990, 992, 1008, 1015, 1020, 1023, 1024, 1044, 1050, 1054, 1056, 1080, 1085, 1088, 1089, 1116, 1120, 1122, 1152, 1155, 1156, 1188, 1190, 1224, 1225, 1260, 1296}.

{(W−4)·(W−4), (W−3)·(W−4), (W−2)·(W−4), (W−1)·(W−4), (W−0)·(W−4), (W+1)·(W−4), (W+2)·(W−4), (W+3)·(W−4), (W+4)·(W−4), (W−3)·(W−3), (W−2)·(W−3), (W−1)·(W−3), (W−0)·(W−3), (W+1)·(W−3), (W+2)·(W−3), (W+3)·(W−3), (W+4)·(W−3), (W−2)·(W−2), (W−1)·(W−2), (W−0)·(W−2), (W+1)·(W−2), (W+2)·(W−2), (W+3)·(W−2), (W+4)·(W−2), (W−1)·(W−1), (W−0)·(W−1), (W+1)·(W−1), (W+2)·(W−1), (W+3)·(W−1), (W+4)·(W−1), (W−0)·(W−0), (W+1)·(W−0), (W+2)·(W−0), (W+3)·(W−0), (W+4)·(W−0), (W+1)·(W+1), (W+2)·(W+1), (W+3)·(W+1), (W+4)·(W+1), (W+2)·(W+2), (W+3)·(W+2), (W+4)·(W+2), (W+3)·(W+3), (W+4)·(W+3), (W+4)·(W+4)}.

{W, W+1, W+2, W+3, W+4, W+5, W+6, W+7, W+8, W+9, W+10, W+11, W+12, W+13, W+14, W+15, W+16, W+17, W+18, W+19, W+20, W+21, W+22, W+23, W+24, W+25, W+26, W+27, W+28, W+29, W+30, W+31, W+32, W+33, W+34, W+35, W+36, W−1, W−2, W−3, W−4, W−5, W−6, W−7, W−8, W−9, W−10, W−11, W−12, W−13, W−14, W−15, W−16, W−17, W−18, W−19, W−20, W−21, W−22, W−23, W−24, W−25, W−26, W−27, W−28, W−29, W−30, W−31, W−32, W−33, W−34, W−35, W−36}.

Therefore, according to Embodiment 1, the present invention provides a method in which mapping from "frequency resource assignment" in 1$^{st}$-stage SCI to frequency parameter(s) of an allocated time/frequency resource (such as the number of sub-channels occupied by each allocated time/frequency resource, or a starting sub-channel of the time/frequency resource 2, or a starting sub-channel of the time/frequency resource 3) and/or mapping from a "time resource assignment" field in the 1$^{st}$-stage SCI to time parameter(s) of the allocated time/frequency resource (such as a slot where the time/frequency resource 2 is located, or a slot where the time/frequency resource 3 is located) is provided so that UE transmitting the SCI can efficiently and unambiguously indicate the allocated time/frequency resource to UE receiving the SCI.

Variant Embodiment

Figure 4:
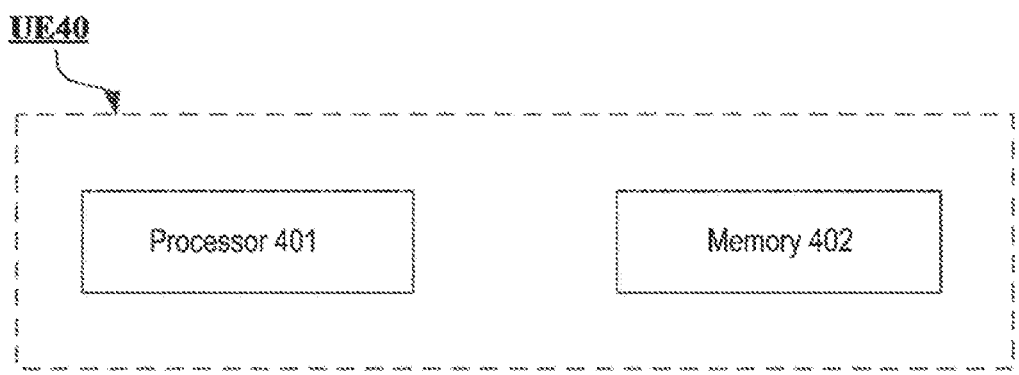
FIG. 4 is a block diagram showing the user equipment (UE) according to the present invention.

Hereinafter, FIG. 4 is used to illustrate user equipment that can perform the method performed by user equipment described in detail above in the present invention as a variant embodiment.

FIG. 4 is a block diagram showing the user equipment (UE) according to the present invention.

As shown in FIG. 4, user equipment (UE) 40 includes a processor 401 and a memory 402. The processor 401 may include, for example, a microprocessor, a microcontroller, an embedded processor, or the like. The memory 402 may include, for example, a volatile memory (for example, a random access memory (RAM)), a hard disk drive (HDD), a non-volatile memory (for example, a flash memory), or other memories. Program instructions are stored in the memory 402. The instructions, when run by the processor 401, can perform the above method performed by user equipment described in detail in the present invention.

The methods and related equipment according to the present invention have been described above in conjunction with preferred embodiments. Those skilled in the art could understand that the methods shown above are only exemplary, and the above embodiments can be combined with one another as long as no contradiction arises. The methods of the present invention are not limited to the steps or sequences illustrated above. The network node and user equipment illustrated above may include more modules. For example, the network node and user equipment may further include modules which can be developed or will be developed in future to be applied to a base station, an MME, UE, and the like. Various identifiers shown above are only exemplary, and are not meant for limiting the present invention. The present invention is not limited to specific information elements serving as examples of these identifiers. A person skilled in the art could make various alterations and modifications according to the teachings of the illustrated embodiments. Those skilled in the art should understand that part of or all of mathematical expressions or mathematical equations or mathematical inequalities may be simplified (for example, incorporating constant terms) or transformed or rewritten to some extent. Mathematical expressions or mathematical equations or mathematical inequalities before and after the simplification or transformation or rewriting may be considered to be equivalent to each other. For example, in equation TRIV=TRIV'+Δ$_T$, if Δ$_T$=0, then TRIV=TRIV'. In this case, the definition of TRIV' can be considered as the definition of TRIV. For another example, in equation TRIV'=T$_1$+Δ$_{T,1}$, if Δ$_{T,1}$=0, then "TRIV'=T$_1$+Δ$_{T,1}$" is equivalent to "TRIV'=T$_1$". For another example, in equation TRIV'=T$_2$+Δ$_{T,2}$, if Δ$_{T,2}$=0, then "TRIV'=T$_2$+Δ$_{T,2}$" is equivalent to "TRIV'=T$_2$".

It is to be understood that the above-described embodiments of the present invention may be implemented by software or by hardware or by a combination of both software and hardware. For example, various components within the base station and the user equipment in the above embodiments may be implemented by means of a variety of devices including, but not limited to, analog circuit devices, digital circuit devices, digital signal processing (DSP) circuits, programmable processors, application-specific integrated circuits (ASICs), field programmable gate arrays (FPGAs), programmable logic devices (CPLDs), and the like.

In the present application, "base station" may refer to a mobile communication data and control switching center having specific transmission power and a specific coverage area and including functions such as resource allocation and scheduling, data reception and transmission, and the like. "User equipment" may refer to a user mobile terminal, such as a terminal device that can perform wireless communication with a base station or a micro base station, including a mobile phone, a notebook, or the like.

In addition, the embodiments of the present invention disclosed herein may be implemented on a computer program product. More specifically, the computer program product is a product provided with a computer-readable medium having computer program logic encoded thereon. When executed on a computing device, the computer program logic provides related operations to implement the aforementioned technical solutions of the present invention. When executed on at least one processor of a computing system, the computer program logic causes the processor to perform the operations (methods) described in the embodiments of the present invention. Such an arrangement of the present invention is typically provided as software, codes and/or other data structures disposed on or encoded on a computer-readable medium such as an optical medium (such as a CD-ROM), a floppy disk, or a hard disk, or other media such as firmware or microcode on one or more ROM or RAM or PROM chips, or downloadable software images and shared databases in one or more modules, or the like. Software or firmware or such configuration may be installed on a computing device such that one or more processors in the computing device perform the technical solutions described in the embodiments of the present invention.

In addition, each functional module or each feature of the base station device and the terminal device used in each of the above embodiments may be implemented or executed by a circuit, and the circuit is usually one or more integrated circuits. Circuits designed to execute the functions described in this description may include general-purpose processors, digital signal processors (DSPs), application-specific integrated circuits (ASICs) or general purpose integrated circuits, field programmable gate arrays (FPGAs) or other programmable logic devices, discrete gates or transistor logic, or discrete hardware components, or any combination of the above. The general purpose processor may be a microprocessor, or the processor may be an existing processor, a controller, a microcontroller, or a state machine. The aforementioned general purpose processor or each circuit may be configured by a digital circuit or may be configured by a logic circuit. Furthermore, when advanced technology capable of replacing current integrated circuits emerges due to advances in semiconductor technology, the present invention can also use integrated circuits obtained by using this advanced technology.

Although the present invention has been illustrated in combination with the preferred embodiments of the present invention, those skilled in the art should understand that various modifications, substitutions, and alterations may be made to the present invention without departing from the spirit and scope of the present invention. Therefore, the present invention should not be limited by the above embodiments, but should be defined by the appended claims and equivalents thereof.

The invention claimed is:

1. A user equipment, comprising:
    a processor, and
    a memory having instructions stored therein, wherein, on the basis of the instructions, the processor is configured to:
    receive 1st-stage Sidelink Control Information (SCI) contained in a Physical Sidelink Control Channel (PSCCH), wherein the 1st-stage SCI indicates a time resource indication value (TRIV) and a frequency resource indication value (FRIV); and
    determine information on one or more allocated Physical Sidelink Shared Channel (PSSCH) resources, the information including a first starting sub-channel index ($f_1$) for a first resource, as an index of a sub-channel on which a lowest Physical Resource Block (PRB) of the PSCCH is transmitted, wherein
    $N_{indicated}^{res}$ is a number of the one or more allocated PSSCH resources indicated in the 1st-stage SCI,
    $N_{indicated}^{res}$ is determined based on the TRIV,
    if $N_{max}^{res}=2$, the information includes a second starting sub-channel index ($f_2$) for a second resource, and a number of contiguously allocated sub-channels (m) for each of the one or more allocated PSSCH resources, satisfying:

$$FRIV = f_2 + \sum_{i=1}^{m-1}\left(N_{subChannel}^{SL} + 1 - i\right)$$

if $N_{max}^{res}=3$, the information includes a second starting sub-channel index ($f_2$) for a second resource and a third starting sub-channel index ($f_3$) for a third resource, and a number of contiguously allocated sub-channels (m) for each of the one or more allocated PSSCH resources, satisfying:

$$FRIV = f_2 + f_3 \cdot \left(N_{subChannel}^{SL} + 1 - m\right) + \sum_{i=1}^{m-1}\left(N_{subChannel}^{SL} + 1 - i\right)^2$$

$N_{max}^{res}$ is a configured maximum number of $N_{indicated}^{res}$,
$N_{indicated}^{res}$ is equal to 1 or 2 when $N_{max}^{res}=2$,
$N_{indicated}^{res}$ is equal to 1, 2, or 3 when $N_{max}^{res}=3$,
$N_{subChannel}^{SL}$ is a configured number of sub-channels in a resource pool,
If $N_{max}^{res}=2$ and $N_{indicated}^{res}=1$, $f_2$ is not used to indicate a PSSCH resource,
If $N_{max}^{res}=3$ and $N_{indicated}^{res}=1$, $f_2$ and $f_3$ are not used to indicate PSSCH resources, and
If $N_{max}^{res}=3$ and $N_{indicated}^{res}=2$, $f_3$ is not used to indicate a PSSCH resource.

2. User-A user equipment, comprising:
    a processor; and
    a memory having instructions stored therein, wherein, on the basis of the instructions, the processor is configured to:
    transmit 1st-stage Sidelink Control Information (SCI) contained in a Physical Sidelink Control Channel (PSCCH), wherein the 1st-stage SCI indicates a time resource indication value (TRIV) and a frequency resource indication value (FRIV); and
    determine information on one or more allocated Physical Sidelink Shared Channel (PSSCH) resources, the information including a first starting sub-channel index ($f_1$) for a first resource, as an index of a sub-channel on which a lowest Physical Resource Block (PRB) of the PSCCH is transmitted, wherein
    $N_{indicated}^{res}$ is a number of the one or more allocated PSSCH resources indicated in the 1st-stage SCI,
    $N_{indicated}^{res}$ indicated is determined based on the TRIV,
    if $N_{max}^{res}=2$, the information includes a second starting sub-channel index ($f_2$) for a second resource, and a number of contiguously allocated sub-channels (m) for each of the one or more allocated PSSCH resources, satisfying:

$$FRIV = f_2 + \sum_{i=1}^{m-1}\left(N_{subChannel}^{SL} + 1 - i\right)$$

if $N_{max}^{res}=3$, the information includes a second starting sub-channel index ($f_2$) for a second resource and a third starting sub-channel index ($f_3$) for a third resource, and a number of contiguously allocated sub-channels (m) for each of the one or more allocated PSSCH resources, satisfying:

$$FRIV = f_2 + f_3 \cdot \left(N_{subChannel}^{SL} + 1 - m\right) + \sum_{i=1}^{m-1}\left(N_{subChannel}^{SL} + 1 - i\right)^2$$

$N_{max}^{res}$ is a configured maximum number of $N_{indicated}^{res}$,
$N_{indicated}^{res}$ is equal to 1 or 2 when $N_{max}^{res}=2$,
$N_{indicated}^{res}$ is equal to 1, 2, or 3 when $N_{max}^{res}=3$,
$N_{subChannel}^{res}$ is a configured number of sub-channels in a resource pool,
If $N_{max}^{res}=2$ and $N_{indicated}^{res}=1$, $f_2$ is not used to indicate a PSSCH resource,
If $N_{max}^{res}=3$ and $N_{indicated}^{res}=1$, $f_2$ and $f_3$ are not used to indicate PSSCH resources, and
If $N_{max}^{res}=3$ and $N_{indicated}^{res}=2$, $f_3$ is not used to indicate a PSSCH resource.

3. A method performed by a user equipment, comprising:
receiving 1st-stage Sidelink Control Information (SCI) contained in a Physical Sidelink Control Channel (PSCCH), wherein the 1st-stage SCI indicates a time resource indication value (TRIV) and a frequency resource indication value (FRIV); and
determining information on one or more allocated Physical Sidelink Shared Channel (PSSCH) resources, the information indicating a first starting sub-channel index ($f_1$) for a first resource, as an index of a sub-channel on which a lowest Physical Resource Block (PRB) of the PSCCH is transmitted, wherein
$N_{indicated}^{res}$ is a number of the one or more allocated PSSCH resources indicated in the 1st-stage SCI,
$N_{indicated}^{res}$ is determined based on the TRIV,
if $N_{max}^{res}=2$, the information indicates a second starting sub-channel index ($f_2$) for a second resource, and a number of contiguously allocated sub-channels (m) for each of the one or more allocated PSSCH resources, satisfying:

$$FRIV = f_2 + \sum_{i=1}^{m-1}\left(N_{subChannel}^{SL} + 1 - i\right)$$

if $N_{max}^{res}=3$, the information indicates a second starting sub-channel index ($f_2$) for a second resource and a third starting sub-channel index ($f_3$) for a third resource, and a number of contiguously allocated sub-channels (m) for each of the one or more allocated PSSCH resources, satisfying:

$$FRIV = f_2 + f_3 \cdot \left(N_{subChannel}^{SL} + 1 - m\right) + \sum_{i=1}^{m-1}\left(N_{subChannel}^{SL} + 1 - i\right)^2$$

$N_{max}^{res}$ is a configured maximum number of $N_{indicated}^{res}$,
$N_{indicated}^{res}$ is equal to 1 or 2 when $N_{max}^{res}=2$,
$N_{indicated}^{res}$ is equal to 1, 2, or 3 when $N_{max}^{res}=3$,
$N_{subChannel}^{res}$ is a configured number of sub-channels in a resource pool,
If $N_{max}^{res}=2$ and $N_{indicated}^{res}=1$, $f_2$ is not used to indicate a PSSCH resource,
If $N_{max}^{res}=3$ and $N_{indicated}^{res}=1$, $f_2$ and $f_3$ are not used to indicate PSSCH resources, and
If $N_{max}^{res}=3$ and $N_{indicated}^{res}=2$, $f_3$ is not used to indicate a PSSCH resource.

\* \* \* \* \*